United States Patent
Takada

(10) Patent No.: US 8,052,773 B2
(45) Date of Patent: Nov. 8, 2011

(54) MANUFACTURING METHOD OF METAL NANOWIRE

(75) Inventor: Hiroshi Takada, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 442 days.

(21) Appl. No.: 12/270,634

(22) Filed: Nov. 13, 2008

(65) Prior Publication Data

US 2009/0130433 A1    May 21, 2009

(30) Foreign Application Priority Data

Nov. 16, 2007    (JP) ................................ 2007-297799

(51) Int. Cl.
     *B22F 9/24*      (2006.01)
(52) U.S. Cl. ............. 75/371; 75/362; 977/762; 977/896
(58) Field of Classification Search .................... 75/330, 75/359; 427/216, 217
See application file for complete search history.

(56) References Cited

U.S. PATENT DOCUMENTS

| | | | |
|---|---|---|---|
| 6,235,540 B1 * | 5/2001 | Siiman et al. .................. | 436/518 |
| 2008/0210052 A1 * | 9/2008 | Allemand ........................ | 75/300 |
| 2009/0283726 A1 * | 11/2009 | Mizoguchi et al. ........... | 252/582 |

FOREIGN PATENT DOCUMENTS

| | | |
|---|---|---|
| JP | 06080422 | 3/1994 |
| JP | 2002266007 | 9/2002 |
| JP | 2004149871 | 5/2004 |
| JP | 2005255985 | 9/2005 |
| JP | 2006519712 | 8/2006 |
| JP | 2006233252 | 9/2006 |
| JP | 2006245516 | 9/2006 |
| JP | 2007074316 | 3/2007 |

* cited by examiner

*Primary Examiner* — Roy King
*Assistant Examiner* — Ngoclan Mai
(74) *Attorney, Agent, or Firm* — Lucas & Mercanti, LLP

(57) ABSTRACT

An object of this invention is to provide a manufacturing method of metal nanowire in which a length and a diameter can be uniformly controlled, metal nanowire having excellent form uniformity, and a transparent electric conductor exhibiting excellent conductivity and transparency by employing metal nanowire having excellent conductivity and transparency. A manufacturing method of metal nanowire which reduces a metal ion in a solution to form metal particles having a wire-form, wherein a nucleus forming process and a particle growth process after said nucleus forming process are provided, and said nucleus forming process reduces a metal ion to form reduced metal, which is directly precipitated on the surface of said particles formed in the said nucleus forming process or on the surface of particles having grown from said nucleus particles during a growth process, whereby metal particles are formed.

6 Claims, No Drawings

MANUFACTURING METHOD OF METAL NANOWIRE

This application is based on Japanese Patent Application No. 2007-297799 filed on Nov. 16, 2007 in Japanese Patent Office, the entire content of which is hereby incorporated by reference.

TECHNICAL FIELD

The present invention relates to a manufacturing of nanowire having a wire-form improved in particle distribution, metal nanowire which is excellent in form uniformity, and a transparent electric conductor utilizing the same which exhibits excellent conductivity and transparency.

BACKGROUND

In recent years, display technologies of various methods such as liquid crystal, plasma, organic electroluminescence and field emission have been developed in accordance with increasing demand on a thinner type TV. In any of these displays having different display methods, a transparent electrode utilizing transparent conductive film has been an indispensable constituent technology. Further, in addition to a TV, also in a touch-panel, a cell phone, an electronic paper, various types of solar batteries and various types of electroluminescence photo-modulation elements, transparent conductive film has been an indispensable technological element.

Heretofore, as transparent conductive film, various metal thin film such as Au, Ag, Pt and Cu; metal oxide thin film such as indium oxide doped with tin or zinc (ITO or IZO), zinc oxide doped with aluminum or gallium (AZG or GZO), tin oxide doped with fluorine or antimony (FTO or ATO); conductive nitride thin layer such as TiN, ZrN and HfN and conductive boronide compound thin film such as $LaB_6$ have been known, and further, various electrodes comprising combinations thereof such as $Bi_2O_3/Au/Bi_2O_3$ and $TiO_2/Ag/TiO_2$ have been known. In addition to an inorganic substance, transparent conductive film utilizing conductive polymer has been also proposed (for example, refer to non-patent document 1).

However, metal thin film, nitride thin film, boronide thin film and conductive polymer film described above have been utilized only in a specific technological field such as electromagnetic wave shielding and a touch-panel field where a relatively high resistance value is allowed because characteristics of optical transparency and conductivity are not compatible.

On the other hand, metal oxide thin film is coming to be a main stream because optical transparency and conductivity can be compatible as well as durability is excellent Particularly, ITO among exemplified metal oxide compound materials is often utilized as a transparent electrode for various optoelectronics applications due to good balance of optical transparency and conductivity as well as easy formation of a micro pattern of an electrode by wet etching with an acid solution. Generally, in preparation of metal oxide thin film including ITO, a gas phase film forming method such as a vacuum evaporation method, a sputtering method and an ion plating method is utilized. However, since these film forming methods require a vacuum environment to make an apparatus big and complex as well as consume a great amount of energy for film formation, development of a technology which can reduce manufacturing cost and environmental load has been required. Further, on the other hand, a larger area of a transparent electrode film is aimed to as represented by a liquid crystal display and a touch-panel display, and accordingly, a demand to lighter weight and flexibility of a transparent electrode material has been increasing.

A method to form transparent conductive film by a liquid phase film forming method such as coating and printing by utilizing a liquid form material containing conductive microparticles has been proposed. For example, in patent document 1, disclosed is a method to form transparent conductive film by coating a dispersion containing conductive metal oxide particles comprising such as indium oxide or tin oxide followed by being subjected to a heat treatment. Further, in patent document 2, disclosed is a film forming method in which the surface of inorganic oxide micro-particles, which have been coated on a substrate, is dissolved and followed by being stabilized by a heat treatment. Further, in patent documents 3-5, disclosed is a method to form a transparent conductive film by coating a dispersion containing such as CNT (carbon nanotube) or metal nanowire on a support.

CNT is a substance which is provided with a structure of a mono-layered or multi-layered coaxial tube form comprising a 6-member ring net work (a graphene sheet) formed by carbon, and is excellent in stability and durability. Further, the conductivity differs depending on a layer number and a structure, and mono-layered CNT exhibits the most superior conductivity. In mono-layered CNT, there are three structures depending on the difference in the orientation of a 6-member ring net work, and two of them are semi-conductive and the lest is metallic. This metallic CNT (arm-chair type CNT) is said to have conductivity comparable to copper and is preferable as a conductive material. However, since an industrial method capable of selective synthesis has not been developed and to utilize metallic CNT by selection is also practically difficult due to such as a yield of only 1% by a isolation method of metallic CNT (refer to non-patent document 2), a transparent conductive film utilizing CNT has not achieved sufficiently low resistance.

On the other hand, metal generally has a high conductivity although it differs depending on an element, and metal nanowire having a conductivity of not less than $1 \times 10^7$ S/m in a bulk state has been reported to be prepared by various methods such as a liquid phase method and a gas phase method. For example, referred to can be such as non-patent documents 3 and 4 as for a manufacturing method of Ag nanowire, such as patent document 6 as for a manufacturing method of Au nanowire, such as patent document 7 as for a manufacturing method of Cu nanowire, and such as patent document 8 as for a manufacturing method of Co nanowire. Particularly, since silver has the highest conductivity among metals and metal nanowire can be easily manufactured in a water phase according to non-patent documents 3 and 4, silver nanowire is regarded as the most excellent conductive material in transparent conductive film utilizing conductive fiber.

In transparent conductive film utilizing metal nanowire as an electric conductor, electric conductivity is exhibited by formation of an electric net work between metal nanowire. Since an electric conductive path of a few μm to a few tens μm long can be formed by one metal nanowire, a percolation threshold value is very small for a material containing metal nanowire to exhibit electric conductivity; therefore, compatibility of conductivity and transparency comes to be possible. With respect to conductivity, it is advantageous that metal nanowire is the longer; however, metal nanowire will be tangled to form an aggregate when it is excessively long, resulting in deterioration of transparency: Contrary, net work formation by metal nanowire becomes insufficient when it is excessively short, resulting in decrease of conductivity, and transparency will decrease when the addition amount of metal nanowire is increased to compensate conductivity. Similarly, diameter of metal nanowire also affects conductivity and transparency; and it is advantageous that the diameter is the larger with respect to conductivity, while it is disadvantageous with respect to transparency.

Therefore, for compatibility of conductivity and transparency, it is important to control the length and diameter of nanowire uniformly. However, including each non-patent document and each patent document described above, a report on a technology to uniformly control the length and diameter of metal nanowire has not been reported at all.

[Patent document 1] Japanese Patent No 3251066
[Patent document 2] JP-A 2006-245516 (hereinafter, JP-A refers to a Japanese Patent Publication Open to Public Inspection No.)
[Patent document 3] JP-A 2005-255985
[Patent document 4] Japanese Translation of PCT International Application Publication No. 2006-519712
[Patent document 5] USP 2007/0074316A1
[Patent document 6] JP-A 2006-233252
[Patent document 7] JP-A 2002-266007
[Patent document 8] JP-A 2004-149871
[Non-patent document 1] "Technologies of Transparent Conductive Film" p. 80 (Ohmsha Publishing)
[Non-patent document 2] URL:http://www.aist.go.jp/aist_j/press release/pr2006/pr20060215/pr20060215.html
[Non-patent document 3] Chem. Mater. 2002, 14, 4736-4745
[Non-patent document 4] Adv. Mater. 2002, 14, 833-837

SUMMARY

As described above, in conventional technologies, since no technology to control length and diameter of metal nanowire to be uniform has been known, it was not possible to make conductivity and transparency compatible in a satisfactory level in transparent conductive film utilizing metal nanowire. Therefore, the first object of this invention is to provide a manufacturing method of metal nanowire which can control length and diameter of metal nanowire to be uniform; the second object is to provide metal nanowire which can exhibit excellent ability in the case of being applied in various electronics devices such as a wiring material of an integrated circuit and a quantum element, an electron emitting source of electronic field emission display (EFD) or a conductive material of transparent conductive film as well as excellent in form uniformity; and the third object is to provide a transparent electric conductor, which is excellent in conductivity and transparency, utilizing metal nanowire having excellent form uniformity.

The inventor of this invention, as a result of extensive study to solve the aforesaid problems, has found that in a forming process of metal nanowire, it is possible to control length along the long axis, particle size (the diameter) along the short axis and particle size distribution thereof, by separating a nucleus forming process and a particle growth process and providing each process with the most suitable condition. This invention has been made based on knowledge obtained from these studies.

That is, the above-described objects of this invention can be achieved by the following means.

1. A method for producing a metal nanowire having a wire-form, comprising the following steps in that order:
   (A) forming a nucleus metal particle by reducing a first metal ion contained in a solution; and
   (B) growing the nucleus metal particle by direct precipitation of a metal formed by reducing a second metal ion in a solution on a surface of the nucleus metal particle.

Herein the first metal ion in step (A) and the second metal ion in step (B) may be same or different.

2. The method for producing a metal nanowire described in aforesaid item 1, wherein each of the solutions used in step (A) and step (B) comprises at least one of an anti-aggregation agent and a form-controlling agent of the nucleus metal particle or of the growing nucleus metal particle.

3. The method for producing the metal nanowire described in aforesaid item 1 or 2, wherein at least one of the first metal ion and the second metal ion is a silver ion.

4. The method for producing the metal nanowire described in aforesaid item 1, further comprising a step of:
   (C) ripening the nucleus metal particle between step (A) and step (B).

5. The method for producing the metal nanowire described in aforesaid item 1, wherein the solution is added by a single-jet method or a multi-jet method in step (A) and step (B).

6. The method for producing the metal nanowire described in aforesaid item 1, wherein a molar concentration of metal salt in the solution utilized in step (A) and step (B) is 0.001-1 mol/L.

7. The method for producing the metal nanowire described in aforesaid item 1, wherein a molar ratio of metal salt in the solution utilized in step (A) to the total metal salt in step (A) and step (B) is 10% or less.

8. The metal nanowire prepared by the method described in aforesaid item 1,
   having a wire-form comprising at least silver and
   having a mean particle size along a long axis of 3 μm or more and a particle size distribution along the long axis of 40% or less.

9. The metal nanowire described in aforesaid item 8,
   having a mean particle size along a short axis of 300 nm or less and a particle size distribution in the short axis of 30% or less.

10. A transparent electric conductor comprising a conductive layer having the metal nanowire described in aforesaid item 8 provided on a transparent support.

11. The metal nanowire described in aforesaid item 8,
   having a mean particle size along the long axis of 5-300 μm.

12. The metal nanowire described in aforesaid item 9,
   having a mean particle size along the short axis of 30-180 nm.

This invention can provide a manufacturing method of metal nanowire capable of controlling length and diameter to be uniform; metal nanowire excellent in form uniformity; and a transparent electric conductor which is excellent in conductivity and transparency, utilizing metal nanowire excellent in form uniformity.

DESCRIPTION OF THE PREFERRED EMBODIMENT

In the following, embodiments of this invention and the details thereof will be explained; however, this invention is not limited thereto but is specified by the description of the scope of claims.

[Manufacturing Method of Metal Nanowire]

In a manufacturing method of metal nanowire of this invention, a nucleus forming process in a particle manufacturing process is a process to generate nucleus particles and a particle growth process means a process to grow particles with little generation of new nucleus particles. In other words, in a nucleus forming process, the particle number increases from before start to after finish of said nucleus forming process; and in a particle growth process, the particle number does not essentially vary between before start and after finish of said particle growth process. Therefore, the both processes can be distinguished by particle number variation. Herein, that particle number does not essentially vary means that the particle number at finish of a particle growth process is within 100±25%, when particle number at start of a particle growth process is 100%.

Specifically, a nucleus forming process in this invention is a process to add a metal salt solution into a solution having reducing property in a reaction vessel to reduce a metal ion and to form micro-particles of metal (nucleus particles) which will be nuclei of growth in a particle growth process. On the other hand, a particle growth process in this invention is a process to add a metal salt solution into a solution containing nucleus particles and having reducing property in a reaction vessel to reduce a metal ion and to grow metal nucleus particles having been formed in a nucleus forming process into metal particles having a wire-like form. A particle growth process in this invention is characterized in that a metal ion is reduced and metal generated by reduction is directly precipitated on the surface of nucleus particles to be grown into wire-like particles, without taking a process of "reduction of a metal ion→precipitation of metal micro-particles→dissolution→re-precipitation on the nucleus particle surface→growth particles into wire-like particles".

In the aforesaid non-patent document 3 (Chem. Mater. 2002, 14, 4736-4745) with respect to a manufacturing method of Ag nanowire, a silver salt solution was added in a short time into a reducing agent solution after nucleus formation to form a large number of silver micro-particles, and then silver micro-particles were dissolved by Ostwald ripening to be re-precipitated on nucleus particles, whereby particle growth was performed Further, in the aforesaid non-patent document 4 (Adv. Mater. 2002, 14, 833-837) with respect to a manufacturing method of Ag nanowire, a silver salt solution was added in a short time into a reducing agent solution in the early stage of particle formation to form a large number of silver micro-particles, and then silver micro-particles were dissolved by Ostwald ripening to be re-precipitated on a part of silver micro-particles, whereby particle growth was performed.

Generally, in a particle growth method utilizing. Ostwald ripening, since particles having the larger size exhibit the faster growing rate to widen the particle size distribution together in accordance with particle growth, it is quite difficult to prepare nanowire particles having a uniform length and diameter. Further, as described in aforesaid each non-patent document, since particles other than those having a wire-form (such as spherical particles) also grow to make a state where wire-form particles and other form particles are mixed, it is necessary to isolate wire-form particles by such as centrifugal separation or filtration as well as yield of wire-form particles decreases, which is not preferable as a manufacturing process of wire-form particles.

Since, in a manufacturing method of metal nanowire of this invention, particle growth is performed in a particle growth process by directly precipitating metal generated by reduction of a metal ion on the surface of nucleus particles or particles during growth which have grown from said nucleus particles, the particle number does not essentially change during a particle growth process. That is, since particle growth utilizing Ostwald ripening is not required in a growth process, uniformity of a particle size and a particle form can be increased.

In a particle growth process of this invention, it is important to control a reduction reaction of a metal ion not to newly generate metal micro-particles. For this purpose, it is necessary to adjust an addition rate and a reduction rate of a metal salt solution containing a metal ion in a particle growth process. In this invention, it is effective to employ a single-jet method or a multi-jet method to control an addition rate of a metal salt solution. To control a reduction reaction rate, it is effective to set preferable conditions of such as a type and a concentration of a reducing agent, a reaction temperature and pH.

A single-jet method or a multi-jet method according to this invention is a method to appropriately control a supply solution amount by use of such as a suitable solution supply apparatus, which adds drop-wise, eject or inject one type or plural types of additive solutions each over the liquid surface or into a liquid in a reaction vessel to perform a reaction in a solution in said vessel, and in this invention, it is possible to utilize one type or plural types of metal salt solutions, a solution containing an anti-aggregation agent or a solution containing a form-controlling agent of metal particles as an additive solution.

In this invention, a mole ratio of metal salt (a metal ion) utilized in a nucleus forming process and a particle growth process can be arbitrarily changed. Further, by adjusting the mole ratio, it is also possible to control a particle size and an aspect ratio. For example, in the case of forming wire-form particles having a high mean aspect ratio, it is advantageous to decrease a mole ratio of metal salt utilized in a nucleus forming process against metal salt utilized in the whole particle manufacturing process. This is because contribution of a particle growth process is large for formation of wire-form particles. Therefore, in this invention, a mole ratio of metal salt utilized in a nucleus forming process is preferably set to not more than 10 mol %, more preferably to not more than 5 mol % and furthermore preferably to 0.001-1 mol %.

In a manufacturing method of metal nanowire of this invention, a ripening process is provided after a nucleus forming process and before a particle growth process. A ripening process in this invention is provided to increase uniformity of a particle distribution and of a particle form by selectively distinguishing particles having relatively small particle size or particles which do not grow into wire-form particles in a particle growth process; which is clearly different from a particle growth by intra-particle ripening described in the aforesaid non-patent document with respect to the object and the function.

In a manufacturing method of metal nanowire of this invention, it is possible to specify the growth direction in a particle growth process to one dimensional direction (a long axis direction of a wire-form particle), by appropriately controlling various conditions such as an addition amount and a concentration in a reaction solution of a form-controlling agent (which will be described later), a hydrogen ion concentration (pH), a metal ion concentration and temperature in a reaction solution. Therefore, it is also possible to control a mean particle size (a mean diameter) along the short axis of wire-form particles after finish of a particle growth process, by a particle size of nucleus particles before start of a particle growth process, that is, by a mean particle size of nucleus particles formed in a nucleus forming process or the above-described ripening process.

A metal composition of nanowire of this invention is not specifically limited, and can be comprised of one type or plural types of noble metal elements and base metal elements, however, preferably contains at least one type of metal belonging to a group comprising noble metals (such as gold, platinum, silver, palladium, rhodium, iridium, ruthenium and osmium), iron, cobalt, copper and tin, and more preferably contains at least silver with respect to conductivity. Further, to make conductivity and stability (resistance against sulfidizing and oxidation, and migration resistance of metal nanowire) to be compatible with each other, it is more preferable to contain silver and one type of metal belonging to noble metals other than silver. In the case of metal nanowire of this invention contains not less than two metal elements, a metal composition in a nucleus forming process and that in a particle growth process may be same or different.

Nanowire of this invention can be formed by reducing a metal ion. A supply source of a metal ion is not specifically limited, and for example, metal halogenide, metal salt of various acids such as metal acetate, metal perhalogenide, metal sulfate, metal nitrate, metal carbonate and metal oxalate can be utilized. Generally, these metal salts can be utilized as a metal salt solution by being dissolved in a solvent such as water. Concentration of a silver ion and at least one metal ion other than silver can be appropriately set to a preferable concentration, however, to set a dilute concentration is preferable with respect to making a reduction reaction of an ion in a reaction solution and a forming reaction of metal nanowire uniform, while to set a concentrated concentration is preferable with respect to increasing the yield of nanowire. Therefore, a volume mol concentration of a solution to be added in this invention is preferably 0.001-1 mol/L. Further, in the case that nanowire of this invention contains not less than two metal elements in a manufacturing process of said particles, metal salt solutions having different compositions may be prepared to be utilized or a solution containing metal salts having different composition together may be utilized.

[Reducing Agent]

In this invention, a reducing agent to reduce a metal ion is not specifically limited provided being a compound capable of reducing objective metal, and at least one type can be utilized by selecting from ordinary chemical reducing agents. A reducing agent preferably utilized in this invention includes, for example, at least one type selected from a group comprising primary or secondary alcohols, glycols, monosaccharide, polysaccharide, ethers in which a hydrogen atom bonds to a carbon atom adjacent to an oxygen atom, ethanolamines and hydrazines.

[Anti-Aggregation Agent]

In a manufacturing method of metal nanowire of this invention, an anti-aggregation agent is preferably utilized in a particle manufacturing process. An anti-aggregation agent is not specifically limited provided being a compound having a protective colloidal function against objective metal nanowire, and includes such as hydrophilic polymer, a metal coordinating molecule, an amphiphilic molecule and an anionic compound.

Hydrophilic polymer includes polymer having an amide group, a hydroxyl group, a carboxyl group and/or an amino group such as polyvinyl pyrrolidone, polyvinyl alcohol and poly(meth)acrylic acid; copolymer of these hydrophilic homo-polymer forming monomer; as well as a natural substance such as cyclodextrin, aminopectin, methylcellulose and gelatin.

A metal coordinating molecule includes an organic molecule having at least one functional group which can coordinate to metal such as an amino group, a thiol group, a disulfide group, an amide group, a phosphine group and sulfone group; and carbon monoxide and nitrogen monoxide.

An amphiphilic molecule includes various monofunctional or polyfunctional surfactants (any of anionic, cationic, nonionic or amphoteric) such as sodium dodecylsulfate and polyethylene glycol monolaurate.

An anionic compound includes such as halogenide such as chloride, perchlorate, various alcoxide, as well as salt of carboxylic acid such as oxalic acid, tartaric acid and citric acid; and salt thereof includes such as alkali metal salt, ammonium salt and amine salt.

The using amount of an anti-aggregation agent is at least 0.1 mol and preferably 1-50 mol, against 1 mol of metal. Herein, in the case of an anti-aggregation agent being polymer, the converted mol number per monomer unit thereof is applied.

[Form-Controlling Agent]

In this invention, a form-controlling agent is preferably utilized to form metal nanowire. A form-controlling agent referred in this invention is a compound having a function to define the growth direction of metal particles in one dimensionally-wise. In many cases, a form-controlling agent preferentially or selectively adsorbs on a specific crystal plane and controls the growth direction by restraining growth of the adsorbed plane. Such as polyvinyl pyrrolidone, polyvinyl alcohol, polyethylene glycol, polyvinyl amine and dextrin, which were listed as example compounds of the aforesaid anti-aggregation agent, can be utilized also as a form-controlling agent. Further, quaternary ammonium salt is also known to function as a form-controlling agent (Patent document 6). In this invention, a form-controlling agent can be also utilized in combination of plural types.

(Metal Nanowire)

Generally, metal nanowire refers to a linear structural substance comprising a metal element as a primary component. Particularly, metal nanowire of this invention is a linear structural substance having a diameter of from atomic scale to nm size.

A conductive layer applied for a transparent electric conductor of this invention exhibits conductivity by that, wire-form metal particles contact each other to form a three dimensional conductive net work. Therefore, it is preferable wire is the longer because of being advantageous for conductive net work formation. On the other hand, when wire is excessively long, wire-form particles may be entangled each other to generate an aggregate resulting in possible deterioration of light scattering. It is preferable to utilize metal particles having the most preferable wire length corresponding to wire-form particles utilized because such as stiffness and diameter of metal nanowire affect net work formation and aggregation generation. In the case that metal nanowire of this invention is utilized in a transparent electric conductor of this invention, a mean particle size along the long axis of metal nanowire is preferably not less than 3 µm, furthermore preferably 3-500 µm and specifically preferably 5-300 µm. In addition, particle size distribution along the long axis is preferably not more than 40%.

In the case of utilizing metal nanowire of this invention as a transparent conductive material, a mean particle size along the short axis (hereinafter, a particle size along the short axis also referred to as a diameter) of metal nanowire is preferably not longer than 300 nm to reduce the effect of light scattering and increase transparency, on the other hand, a mean particle size along the short axis is preferably the larger to increase conductivity. In this invention, a mean particle size along the short axis of metal nanowire is preferably 10-200 nm and more preferably 30-180 nm. In addition, particle size distribution along the short axis is preferably not more than 20%.

In this invention, a length, a diameter and an aspect ratio (=length/diameter) of metal nanowire can be determined from arithmetic average of the values of each metal nanowire which was measured by taking an electronmicrophotograph with respect to a sufficient number of wire particles. A length of metal nanowire essentially should be measured in a state of being stretched linear form, however, may be determined by assuming a column (length=projected area/projected diameter) after calculating a projected diameter and a projected area of metal nanowire by use of an image analyzer based on an electronmicrophotograph. Further, a particle size distribution along the long axis or along the short axis is expressed by a value of a standard deviation of a measured particle size divided by a mean particle size and multiplied by 100.

Particle size distribution[%]=standard deviation of particle size/mean particle size×100

A number of metal nanowire subjected to measurement is preferably at least 100 particles and more preferably not less than 300 particles of wire-form particles.

[Transparent Electric Conductor]

A conductive layer according to a transparent electric conductor of this invention may contain a transparent binder material and an additive in addition to metal nanowire of this invention A transparent binder material can be widely selected and utilized from natural polymer resin or synthetic polymer resin For example, transparent thermoplastic resin (such as polyvinyl chloride, polyvinylchloride-vinyl acetate copolymer, polymethacrylate, nitrocellulose, chlorinated polyethylene, chlorinated polypropylene and vinylidene fluoride); and transparent curable resin which can be cured by heat, light, electron rays or radiation (such as melamine acrylate, urethane acrylate, epoxy resin, polyimide resin and silicone resin such as acryl modified silicate) can be utilized. An additive includes a plastisizer, a stabilizer such as an antioxidant, a surfactant, a solubility enhancing agent, a polymerization inhibitior and colorant such as dye and pigment. Further, a solvent (water and an organic solvent such as alcohols, glycols, cellosolves, ketones, esters, ethers, amides and hydrocarbons) can be incorporated with respect to enhancing coating capability and working property.

Thickness of a conductive layer containing metal nanowire, although differs depending on metal nanowire utilized, is preferably not less than a diameter of a mean diameter of metal nanowire and not more than 500 nm as an approximate guide line. It is preferable to decrease the thickness of a conductive layer containing metal nanowire because of making net work formation in the thickness direction compact.

[Conductive Layer]

Thickness of a transparent electric conductor in a conductive layer according to this invention is not specifically limited and can be selected depending on the purpose, however, in general, is preferably not more than 10 μm and the thinner thickness is preferable because transparency is improved.

Total optical transmittance of a transparent electric conductor is preferably not less than 60%, more preferably not less than 70% and specifically preferably not less than 80%. Total optical transmittance can be measured according to a method well known in the art by use of such as a spectrometer. Further, electric resistance of a transparent electrode of this invention is preferably not more than $10^4 \Omega/\square$, more preferably not more than $10^3 \Omega/\square$ and specifically preferably not more than $10^2 \Omega/\square$. When it is over $10^4 \Omega/\square$, the transparent electrode may not sufficiently function as an electrode or may not achieve a sufficient electric wave shielding characteristic in the case of being utilized as a transparent electrode or an electric wave shielding material for such as a liquid crystal display and a transparent touch panel. The aforesaid surface resistance, for example, can be measured based on such as JIS K/194 and ASTM D257, and also can be simply measured by use of a surface resistance meter available on the market.

A transparent electric conductor of this invention can be appropriately provided with various functional layers such as a hard coat layer, a non-glare coat layer, a barrier coat layer, an anchor coat layer, a carrier transport layer and a carrier accumulation layer. In the case of providing a hard coat layer or a non-glare coat layer, it is preferably arranged on the opposite side against a conductive layer according to this invention sandwiching a transparent support; in the case of providing a barrier coat layer, it is preferably arranged between a transparent support and a conductive layer according to this invention; and in the case of providing an anchor coat layer, a carrier transport layer or a carrier accumulation layer, it is preferably arranged on the same side with a conductive layer according to this invention against a transparent support.

A transparent electric conductor of this invention may contain conductive polymer in a conductive layer according to this invention or in a layer other than said layer. Conductive polymer utilizable in a transparent conductive layer of this invention includes a compound selected from a group comprising each derivatives of polypyrrole, polyaniline, polythiophene, polythienylene vinylene, polyazulene, polyisothianaphthene, polycarbazole, polyacetylene, polyphenylene, polyphenylene vinylene, polyacene, polyphenylacene, polydiacetylene and polynaphthalene.

A transparent electric conductor of this invention may contain either one type of conductive polymer alone or at least two types of conductive polymers in combination, however, it is more preferable to contain at least one type selected from a group comprising polyaniline having a repeating unit represented by following formula (I) or formula (II) or a derivative thereof, a polypyrrole derivative having a repeating unit represented by following formula (III), a polythiophene derivative having a repeating unit represented by following formula (IV), with respect to conductivity and transparency.

Formula (I)

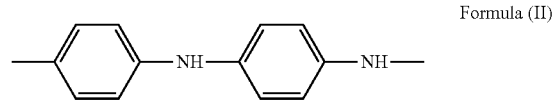

Formula (II)

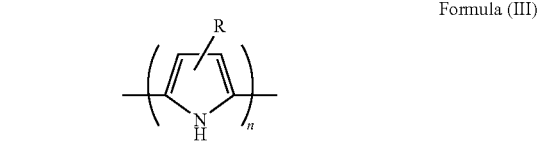

Formula (III)

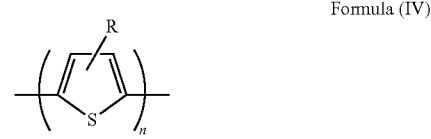

Formula (IV)

Herein, R is primarily a linear organic substituent and is preferably an alkyl groups an alkoxy group, an allyl group or combinations thereof, however, provided not losing a property as soluble conductive polymer, such as a sulfonate group, an ester group and an amide group may bond or may be combined; and n is an integer.

Conductive polymer utilized in a transparent electric conductor of this invention can be subjected to a doping treatment to enhance conductivity. A dopant against conductive polymer includes, for example, at least one type selected from a group comprising sulfonic acid provided with a hydrocarbon group having a carbon number of 6-30 or polymer thereof (such as polystyrene sulfonate), a halogen atom, a Lewis acid, a proton acid, a transition metal halogenide, a transition metal compound, an alkali metal, an alkaline earth metal, $MClO_4$ ($M=Li^+$ or $Na^+$), $R_4N^+$ ($R=CH_3$, $C_4H_9$ or $C_6H_6$), or $R_4P^+$; ($R=CH_3$, $C_4H_9$ or $C_6H_6$). Among them, the above-described long chain sulfonic acid is preferable.

Long chain sulfonic acid includes such as dinonylnaphthalene disulfonate, dinonylnaphthalene sulfonate and dodecylbenzene sulfonate. Halogen includes such as $Cl_2$, $Br_2$, $I_2$, $ICl_3$, $IBr$ and $IF_6$. Lewis acid includes such as $PF_6$, $ASP_6$, $SbF_5$, $BF_3$, $BCl_3$, $BRr_3$, $SO_3$ and $GaCl_3$. Proton acid includes HF, HCl, $HNO_3$, $H_2SO_4$, $HBF_4$, $HClO_4$, $FSO_3H$, $ClSO_3H$ and $CF_3SO_3H$. Transition metal halogenide includes such as $NbF_5$, $TaF_5$, $MoP_5$, $WF_5$, $RuF_5$, $BiF_5$, $TiCl_4$, $ZrCl_4$, $MoCl_5$, $MoCl_3$, $WCl_5$, $FeCl_3$, $TeCl_4$, $SnCl_4$, $SeCl_4$, $FeBr_3$ and $SnI_5$. A transition metal compound includes such as $AgClO_4$, $AgBrF_4$, $La(NO_3)_3$ and $Sm(NO_3)_3$. Alkali metal includes such as Li, Na, K, Rb and Cs. Alkaline earth metal includes such as Be, Mg, Ca, Sc and Ba.

Further, a dopant against conductive polymer may be introduced in fullerenes such as fullerene hydride, fullerene hydroxide and fullerene sulfonate. In a transparent electrode, the above-described dopant is preferably contained at not less than 0.001 weight part against 100 weight parts of conductive polymer. Herein, a transparent electrode of this invention may contain the both of at least one type of dopant selected from a group comprising long chain sulfonic acid, polymer of long chain sulfonic acid (such as polystyrene sulfonate), halogen, Lewis acid, proton acid, transition metal halide, a transition metal compound, alkali metal, alkaline earth metal, $MClO_4$, $R_4N^+$ and $R_4P^+$ and fullerenes.

As conductive polymer utilized in a transparent electric conductor of this invention, conductive polymer modified by a metal, which is disclosed in such as Japanese Translation of PCT International Application Publication No. 2001-511581, JP-A Nos. 2004-99640 and 2007-165199, can be also utilized.

In a conductive layer containing conductive polymer according to a transparent electric conductor of this invention, a water-soluble organic compound may be incorporated. Among water soluble organic compounds, a compound having an effect to improve conductivity by addition in a conductive polymer material is known, which is sometimes referred to as a 2nd. dopant (or a sensitizer). A 2nd. dopant utilizable in a transparent electric conductor is not specifically limited; and can be selected from those well known in the art, and preferably includes an oxygen-containing compound.

The aforesaid oxygen-containing compound is not specifically limited provided containing oxygen, and includes such as a hydroxide group containing compound, a carbonyl group containing compound, an ether group containing compound and a sulfoxide group containing compound. The aforesaid hydroxyl group containing compound includes such as ethylene glycol, diethylene glycol, propylene glycol, trimethylene glycol, 1,4-butadiene glycol and glycerin, and among them, ethylene glycol and diethylene glycol are preferable. The aforesaid carbonyl group containing compound includes such as isophorone, propylene carbonate, cyclohexanone and γ-butyrolactone. The aforesaid ether group containing compound includes such as diethylene glycol monoethylether.

The aforesaid sulfoxide group containing compound includes such as dimethylsulfoxide. These may be utilized alone or in combination of not less than two types; however, it is specifically preferable to utilize at least one type selected from dimethylsulfoxide, ethylene glycol and diethylene glycol.

In a conductive layer containing conductive polymer according to a transparent electric conductor of this invention, the content of the above-described 2nd. dopant against 100 weight parts of conductive polymer is preferably not less than 0.001 weigh part, more preferably 0.01-50 weight parts and specifically preferably 0.01-10 weight parts.

A conductive layer containing conductive polymer according to a transparent electric conductor of this invention may contain a transparent resin component and an additive in addition to conductive polymer to secure film forming property and film strength. A transparent resin component is not specifically limited provided being capable of compatible or capable of mixing dispersed with conductive polymer, and may be either thermosetting resin or thermoplastic resin.

For example, curable resin includes such as thermosetting resin, ultraviolet curable resin and electron beam curable resin, however, ultraviolet curable resin among these curable resins is preferably utilized because of simple facilities for resin curing and excellent working property. Ultraviolet curable resin is resin which is cured via such as a cross-linking reaction by ultraviolet ray irradiation, and a component containing monomer provided with an ethylenic unsaturated double bond is preferably utilized. For example, listed are acrylurethane type resin, polyester acrylate type resin, epoxyacrylate type resin and polyol acrylate type resin. In this invention, ultraviolet curable resin of an acryl type or an acrylurethane type is preferably utilized as a primary component of a binder.

Acrylurethane type resin can be easily prepared by further making a product, which has been prepared by a reaction of polyester polyol with isocyanate monomer or prepolymer, react with acrylate type monomer having a hydroxyl group such as 2-hydroxyethyl acrylate, 2-hydroxyethylmethacrylate (hereinafter, acrylate includes methacrylate and is expressed only as acrylate) and 2-hydroxypropylacrylate. For example, those described in JP-A 59-151110 can be utilized. For example, a mixture of 100 parts of Unidic 17-806 (manufactured by Dainippon Ink and Chemicals, Inc.) and 1 part of Coronate L (manufactured by Nippon Urethane Engineering Co., Ltd.) is preferably utilized.

Ultraviolet curable polyester type resin generally includes those easily prepared by making polyester polyol react with monomer of a 2-hydroxyethylacrylate type or a 2-hydroxyacrylate type, and those described in JP-A 59-151112 can be utilized.

Specific examples of ultraviolet curable epoxyacrylate type resin include those formed by employing epoxyacrylate as oligomer which is added with a reactive diluent and an optical reaction initiator to react, and those described in JP-A 1-105738 can be utilized.

Specific examples of ultraviolet curable polyol acrylate type resin include such as trimethylolpropane triacrylate, ditrimethylolpropane tetraacrylate, pentaerythritol triacrylate, pentaerythritol tetraacrylate, dipentaerythritol hexaacrylate and alkyl modified dipentaerythritol pentaacrylate.

Resin monomer includes a general monomer such as methyl acrylate, ethyl acrylate, butyl acrylate, benzyl acrylate, cyclohexyl acrylate, vinyl acetate and styrene as monomer having one unsaturated double bond Further, as monomer having not less than two unsaturated double bonds, listed are ethylene glycol diacrylate, propylene glycol diacrylate, divinyl benzene, 1,4-cyclohexane diacrylate and 1,4-cyclohexyl dimethylacrylate; and trimethylolpeopane triacrylate and pentaerythritol tetraacrylate which are described above.

Among them, as a primary component of a binder, preferable is active ray curable resin of an acryl type selected from 1,4-cyclohexane diacrylate, pentaerythritol tetra(meth)acrylate, pentaerythritol tri(meth)acrylate, trimethylolpropane (meth)acrylate, trimethylolethane (meth)acrylate, dipentaerythritol tetra(meth)acrylate, dipentaerythritol (meth)acrylate, dipentaerythritol hexa(meth)acrylate, 1,2,4-cyclohexane tetramethacrylate, polyurethane polyacrylate and polyester acrylate.

As a photoreaction initiator of these ultraviolet curable resins specifically includes such as benzoine and derivatives thereof; acetophnone, benzophenone, hydroxybenzophenone, Michler's ketone, α-amiloxim ester and thioxantone and derivatives thereof. An optical sensitizer may be utilized together. The above-described reaction initiators can be also utilized as an optical sensitizer. Further, sensitizers such as n-butylamine, triethylamine and tri-n-butylphosphine can be utilized. An optical reaction initiator or a photo-sensitizer is preferably added at 0.1-15 weight parts and preferably at 1-10 weight parts, against 100 weight parts of said composition.

[Transparent Support]

A transparent support utilized in a transparent electric conductor of this invention is not specifically limited and such as the material, form, structure and thickness can be appropriately selected from those well known in the art. For example, such as a glass substrate, a resin substrate and resin film are preferably listed with respect to excellent hardness and easiness to form a conductive layer on the surface thereof, however, resin film is preferably utilized with respect to light weight and flexibility. Said resin is not specifically limited and can be appropriately selected from those well known in the art; and includes such as polyethylene terephthalate resin, polybutylene terephthalate resin, polyethylene naphthalate resin, polyvinyl chloride resin, polyether sulfone resin, polycarbonate resin, polystyrene resin, polyimide resin, polyetherimide resin, polyvinyl acetate resin, polyvinilidene chloride resin, polyvinilidene fluoride resin, polyvinyl alcohol resin, polyvinyl acetal resin, polyvinyl butyral resin, polymethylmethacrylate resin, polyacrylonitrile resin, polyolefin polystyrene resin, polyamide resin, polybutadiene resin, cellulose acetate, cellulose nitrate and acrylonitrile-butadiene-styrene copolymer resin. These may be utilized alone or in combination of not less than two types. Among these, polyethylene terephthalate resin is preferable with respect to excellent transparency and flexibility.

[Additive]

In transparent resin utilized in this invention, incorporated may be an additive such as a plastisizer, a stabilizer like an antioxidant, a surfactant, a dissolution accelerator, a polymerization inhibitor and a colorant like dye and pigment, depending on the purpose. Further, in transparent resin utilized in this invention, incorporated may be a solvent (such as water, and an organic solvent like alcohols, glycols, cellosolves, ketones, esters, amides and hydrocarbons), with respect to working property such as coating capability.

[Hydrophobicity Treatment]

In this invention, metal nanowire prepared in a water system can be appropriately subjected to a hydrophobicity treatment. For example, a method to provide metal nanowire with a hydrophobicity treatment can be referred to such as a description of JP-A 2007-500606.

[Manufacturing Method of Transparent Electric Conductor]

A manufacturing method of a transparent electric conductor according to this invention is not specifically limited; however, a liquid phase film forming method such as a coating method or a printing method is preferably employed to form a conductive layer. As a coating method, such as a roll coat method, a bar coat method, a dip coating method, a spin coating method, a casting method, a die coat method, a blade coat method, a gravure coat method, a curtain coat method, a spray coat method and a doctor coat method can be utilized. As a printing method, such as a relief (letter press) printing method, a stencil (screen) printing method, a planographic (off-set) printing method, an intaglio (gravure) printing method, a spray printing method and an inkjet printing method can be utilized. Further, a transparent wiring and a transparent circuit can be also prepared by patterning a transparent electric conductor characterized by this invention on a transparent support. Herein, a physical surface treatment such as corona discharge treatment and a plasma discharge treatment may be appropriately provided on the transparent support surface as a preliminary treatment to improve adhesion and/or coating capability.

EXAMPLES

In the following, this invention will be specifically explained with reference to examples; however, this invention is not limited thereto. Herein, "part(s)" or "%" is used in examples and means "weight part(s)" or "weight %", unless otherwise mentioned.

Example 1

Preparation of Metal Nanowire

[Preparation of Metal Nanowire NW-11: this Invention]

Based on a method described in aforesaid non-patent document 4 (Adv. Mater 2002, 14, 833-837), employing ethylene glycol (EG) as a reducing agent and polyvinyl pyrrolidone (PVP) as a protective colloid and a form-controlling agent as well as separating following nucleus forming process 1 and following particle growth process 1, metal nanowire NW-11 having a wire-form was prepared.

(Nucleus Forming Process 1)

An EG solution of 100 ml kept at 160° C. in a reaction vessel while being stirred, was added with 10 ml of an EG solution of silver nitrate (concentration of silver nitrate: $1.5 \times 10^{-4}$ mol/L) at a constant flow rate over 10 seconds. Thereafter, nucleus particles of silver were formed by reducing a silver ion while the system was kept at 160° C. for 5 minutes. The reaction solution presented yellow color arising from the surface plasmon absorption of silver micro-particles of nano size to confirm that micro-particles (nucleus particles of silver had been formed by reducing a silver ion.

(Particle Growth Process 1)

The reaction solution containing nucleus particles which finished above-described nucleus forming process 1, while being kept at 160° C. with stirring, was added with 100 ml of an EG solution of silver nitrate (silver nitrate concentration: $1.0 \times 10^{-1}$ mol/L) and 100 ml of an EG solution of PVP (PVP concentration: converted to VP $5.0 \times 10^{-1}$ mol/L) at a constant flow rate over 120 minutes by use of a double-jet method. When a reaction solution was sampled at every 20 minutes to be observed through an electronmicroscope in the particle growth process, it was confirmed that nucleus particles having been formed in a nucleus forming process have grown up to a wire-form with elapse of time and no generation of new micro-particles in the particle growth process was observed.

(Washing Process 1)

After finishing above-described particle growth process 1, the reaction solution, after having been cooled to room temperature, was filtered by use of a filter having a mean pore size of not more than 1 μm and the filtered silver particles were re-dispersed in ethanol. After repeating 5 times of filtration by a filter and re-dispersion into ethanol, of silver particles, ethanol dispersion of silver particles was finally prepared. Herein, the filtrate was collected and subjected to quantitative analysis, whereby silver contained in the filtrate was confirmed to be less than 0.1% of silver utilized in particle formation.

[Preparation of Metal Nanowire NW-12: this Invention]

Metal nanowire NW-12 as wire-form silver particles was prepared in a similar manner as preparation of above-described metal nanowire NW-11, except that following ripening process 1 was performed after finishing nucleus forming process 1 and before following particle growth process 2.

(Nucleus Forming Process 1)

Nucleus formation was performed in a similar manner to nucleus forming process 1 utilized for preparation of above-described metal nanowire NW-11.

(Ripening Process 1)

After finishing above-described nucleus forming process 1, the reaction solution containing nucleus particles was added with 10 ml of an EG solution of PVP (PVP concentration: Converted to VP, $5.0\times10^{-1}$ mol/L) over 3 seconds with stirring. Thereafter, the temperature was raised to 170° C. and kept as it is for 10 minutes to perform ripening.

After finishing above-described ripening process 1, the reaction solution containing nucleus particles, temperature of which was lowered to 160° C. to be kept as it is with stirring, was added with 100 ml of an EG solution of silver nitrate (silver nitrate concentration: $1.0\times10^{-1}$ mol/L) and 90 ml of an EG solution of PVP (PVP concentration: Converted to VP, $5.0\times10^{-1}$ mol/L) at a constant flow rate over 120 minutes, by use of a double-jet method. In particle growth process 2, the reaction solution was sampled at every 20 minutes and observed through an electronmicroscope to confirm that nucleus particles having been formed in nucleus forming process 1 grew up to a wire-form with elapse of time and there was no generation of new micro-particles in the particle growth process.

(Washing Process 1)

A washing treatment was performed in a similar manner to washing process 1 utilized for preparation of metal nanowire NW-11. The filtrate was collected to be subjected to quantitative analysis to confirm that silver contained in the filtrate was less than 0.1% against silver utilized for particle formation.

(Preparation of Metal Nanowire NW-13: Comparative Example)

Based on a method described in aforesaid non-patent document 4 (Adv. Mater. 2002, 14, 833-837), employing ethylene glycol (EG) as a reducing agent and polyvinyl pyrrolidone (PVP) as a protective colloid and a form-controlling agent, via following nucleus forming process 2 and particle growth process 3 and washing process 2, metal nanowire NW-13 which is silver particles having a wire-form was prepared.

(Nucleus Forming Process 2)

An EG solution of 100 ml kept at 160° C. in a reaction vessel while being stirred, was added with 100 ml of an EG solution of silver nitrate (concentration of silver nitrate: $1.0\times10^{-1}$ mol/L) at a constant flow rate over 10 minutes.

(Particle Growth Process 3)

Thereafter, particle growth was performed by ripening over 120 minutes while the system was kept at 160° C. with stirring. Yellow color arising from the surface plasmon absorption of silver micro-particles in the reaction solution became lighter with elapse of time, which suggested distinguish of particles and growth of particles due to Ostwald ripening. In particle growth process 3, the reaction solution was sampled at every 20 minutes to be observed through an electronmicroscope, whereby the state was confirmed where the nucleus particle number decreased with elapse of time, and many particles during growth process grew up to silver particles having a wire-form while a part of particles grew up to silver particles having a form different from a wire-form such as a spherical or irregular form.

(Washing Process 2)

After finishing above-described particle growth process 3, the reaction solution was cooled down to room temperature to be filtered through a filter having a mean pore size of not more than 1 μm, and the silver particles filtered was re-dispersed in ethanol. Filtration by a filter and re-dispersion into ethanol, of silver particles, were repeated 5 times to finally prepare an ethanol dispersion of silver particles. Herein, the filtrate was recovered and subjected to quantitative analysis to confirm that approximately 9% of silver having been utilized for particle formation was contained in the filtrate.

(Preparation of Metal Nanowire NW-14: Comparative Example)

Metal nanowire NW-14 as wire-form silver particles was prepared in a similar manner to preparation of above-described metal nanowire NW-11, except that particle growth process 4 described below was applied instead of particle growth process 1.

(Nucleus Forming Process 1)

Nucleus formation was performed in a similar manner to nucleus forming process 1 utilized for preparation of above-described metal nanowire NW-11.

(Particle Growth Process 4)

The reaction solution containing nucleus particles which had finished nucleus forming process 1, while being kept at 160° C. with stirring, was added with 100 ml of an EG solution of silver nitrate (silver nitrate concentration: $1.0\times10^{-1}$ mol/L) and 100 ml of an EG solution of PVP (PVP concentration: Converted to VP $5.0\times10^{-1}$ mol/L) at a constant flow rate over 10 minutes by use of a double-jet method. Particle growth was performed, while being kept at 160° C. with stirring, by ripening over 110 minutes. When the reaction solution was sampled to be observed through an electronmicroscope in particle growth process 4, it has been confirmed that many micro-particles generated after addition of first 10 minutes, the number of micro-particles decreased with elapse of time, and many particles during a growth process grew up to silver particles having a wire-form while a part of particles grew up to silver particles having a form different from a wire-form such as a spherical or irregular form.

(Washing Process 1)

A washing treatment was performed in a similar manner to washing process 1 utilized for preparation of metal nanowire NW-11. The filtrate was collected to be subjected to quantitative analysis to confirm that silver contained in the filtrate was approximately 3% of silver utilized for particle formation.

(Preparation of Metal Nanowire NW-15: Comparative Example)

Metal nanowire NW-15 as wire-form silver particles was prepared in a similar manner to preparation of above-described metal nanowire NW-11, except that particle growth process 5 described below was applied instead of particle growth process 1.

(Nucleus Forming Process 1)

Nucleus formation was performed in a similar manner to nucleus forming process 1 utilized for preparation of above-described metal nanowire NW-11.

(Particle Growth Process 5)

The reaction solution containing nucleus particles which had finished nucleus forming process 1, while being kept at 160° C. with stirring, was added with 125 ml of an EG solution of silver nitrate (silver nitrate concentration: $1.0 \times 10^{-1}$ mol/L) and 125 ml of an EG solution of PVP (PVP concentration: Converted to VP $5.0 \times 10^{-1}$ mol/L) at a constant flow rate over 10 minutes by use of a double-jet method. Particle growth was performed, while being kept at 160° C. with stirring, by ripening over 120 minutes. In particle growth process 5, the reaction solution was sampled to be observed through an electronmicroscope, and it has been confirmed that many micro-particles generated after addition of first 10 minutes, the number of micro-particles decreased with elapse of time, and many particles during a growth process grew up to silver particles having a wire-form while a part of particles grew up to silver particles having a form different from a wire-form such as a spherical or irregular form.

(Washing Process 1)

A washing treatment was performed in a similar manner to washing process 1 utilized for preparation of metal nanowire NW-11. The filtrate was collected to be subjected to quantitative analysis to confirm that silver contained in the filtrate was approximately 4% of silver utilized for particle formation.

<Form Measurement of Metal Nanowire>

With respect to metal nanowire prepared in the above manner, a mean particle size and particle size distribution along the long axis and along the short axis, and yield were measured according to the following method, and the results are shown in table 1.

(Measurement of Mean Particle Size)

With respect to each metal nanowire prepared above, an electronmicroscopic photograph was taken to measure particle sizes along the long axis and along the short axis of 300 particles of metal nanowire, and the arithmetic average was calculated.

(Measurement of Particle Distribution)

Particle distribution along the long axis and along the short axis was determined as a value which is a standard deviation of particle size, having been measured above, being divided by a mean particle size and multiplied by 100.

Particle size distribution[%]=standard deviation of particle size/mean particle size×100

Yield was calculated from a quantitative analysis value of a filtrate when silver particles flew out into a filtrate in a washing process were regarded as particles not having a wire-form and defined as a loss.

TABLE 1

| Metal Nanowire No. | Long axis direction | | Short axis direction | | Yield (%) | Remarks |
|---|---|---|---|---|---|---|
| | Mean particle size (nm) | Particle size distribution (%) | Mean particle size (nm) | Particle size distribution (%) | | |
| NW-11 | 6.2 | 32 | 72 | 22 | About 100 | Inv. |
| NW-12 | 7.6 | 23 | 88 | 14 | About 100 | Inv. |
| NW-13 | 4.3 | 57 | 56 | 31 | 89 | Comp. |
| NW-14 | 5.7 | 44 | 67 | 24 | 97 | Comp. |
| NW-15 | 7.8 | 47 | 72 | 26 | 96 | Comp. |

Inv.: Invention,
comp.: Comparison

It is clear from the results described in table 1 that wire-form silver particles NW-11 and NW-12 have a narrower particle size distribution along the long axis and along the short axis direction compared to wire-form particles NW-13 NW-15 of comparative examples prepared by a conventional method, which shows that wire-form silver particles having excellent form uniformity have been prepared according to a manufacturing method of this invention. Further, by employing a manufacturing method of this invention, production efficiency and manufacturing cost can be improved because the yield of metal particles having a wire-form is increased.

Example 2

Preparation of Transparent Electric Conductor

[Preparation of Transparent Electric Conductor TC-11: this Invention]

Transparent electric conductor TC-11 was prepared by use of a dispersion of metal nanowire NW-11 having been prepared in example 1, according to the following method.

On a polyethylene terephthalate (PET) support having a total optical transmittance of 90%, a dispersion of metal nanowire NW-11 was coated and dried so as to make a coated amount of wire-form silver particles of 0.3 g/m² by use of a spin coater. Successively, a coated layer of metal nanowire NW-11, after having been subjected to a calendar treatment, was coated with a methyl ethyl ketone solution of urethane acrylate by use of a spin coater followed by being dried, whereby transparent electric conductor TC-21 was prepared. Herein, the layer thickness of a urethane acrylate was set to a thickness not to completely berry a metal nanowire layer, the part of them being exposed from a urethane acrylate layer, as well as to be able to fix metal nanowire layer on the support.

[Preparation of Transparent Electric Conductors TC-12-TC-15]

Transparent electric conductors TC-12-TC-15 were prepared in similar manner to preparation of transparent electric conductor TC-11 described above, except that metal nanowires NW-12-NW-15 were utilized instead of metal nanowire NW-11.

<Measurement of Total Optical Transmittance and Specific Surface Resistance of Transparent Electric Conductor>

With respect to each transparent electric conductor having been prepared in the above manner, measurement of total optical transmittance and specific surface resistance was performed, and the results obtained are shown in table 2.

A total optical transmittance (an integral value) was measured by use of Spectrophotometer U-4000 manufactured by Hitachi Corp. at a visible light region (360 nm-700 nm). Further, a specific surface resistance was measured based on JIS K7194.

TABLE 2

| Transparent electric conductor No. | Metal Nanowire No. | Measurement of characteristics | | Remarks |
|---|---|---|---|---|
| | | Specific surface resistance ($\Omega/\square$) | Total optical transmittance (%) | |
| TC-11 | NW-11 | 36 | 82 | Invention |
| TC-12 | NW-12 | 28 | 85 | Invention |
| TC-13 | NW-13 | 92 | 81 | Comparison |
| TC-14 | NW-14 | 67 | 79 | Comparison |
| TC-15 | NW-15 | 51 | 74 | Comparison |

It is clear from the results described in table 2 that transparent electric conductors TC-11 and TC-12 are excellent in both of specific surface resistance and total optical transmittance compared to transparent electric conductors TC-13-TC-15 as comparative examples. One of the reasons why specific surface resistance of transparent electric conductors TC-13 and TC-14 is high is estimated to be due to a short mean particle size along the long axis, however, it is also considered that not only a mean length but also distribution thereof affects conductivity of an electric conductor because specific surface resistance of transparent electric conductor TC-15, which has a mean length not less than those of transparent electric conductors TC-11 and TC-12, is inferior to those of transparent electric conductors TC-11 and TC-12. That is, compared to transparent electric conductors TC-13-TC-15, transparent electric conductors TC-11 and TC-12 are estimated to achieve good conductivity because a small mixing ratio of particles having a short length which contributes little to inter-particle conductive net work formation. Further, that total optical transmittance of transparent electric conductors TC-11 and TC-12 is superior to that of transparent electric conductors TC-13-TC-15 is considered to be because of small distribution of a mean particle size along the short axis and no presence of mixed particles having a large diameter to affect light scattering.

As described above, according to a manufacturing method of metal nanowire of this invention, it is possible to control a length and a diameter of metal nanowire to be uniform; further excellent capability can be exhibited in the case of being applied for various electronics devices such as an integrated circuit, a wiring material of a quantum element, an electron emission source of an electric field emission display and a conductive material of a transparent conductive layer because metal nanowire of this invention is excellent in form uniformity; in addition to these, a transparent electric conductor can be obtained by utilizing metal nanowire of this invention having excellent form uniformity.

What is claimed is:

1. A method for producing a metal nanowire having a wire-form, comprising the following steps in that order:
   (A) forming a nucleus metal particle by reducing a first metal ion contained in a metal salt solution (A) by adding the metal salt solution (A) to a solution comprising a reducing agent (A); and
   (B) growing the nucleus metal particle by direct precipitation of a metal formed by reducing a second metal ion contained in a metal salt solution (B) on a surface of the nucleus metal particle by adding the metal salt solution (B) and a solution comprising a reducing agent (B) into the solution obtained by step (A), wherein a molar ratio of metal salt in the metal salt solution (A) to the total metal salt in metal salt solution (A) and metal salt solution (B) is 10% or less.

2. The method for producing a metal nanowire of claim 1, wherein the solution comprising reducing agent (A) and the solution comprising reducing agent (B) further comprises at least one of an anti-aggregation agent and a form-controlling agent of the nucleus metal particle or of the growing nucleus metal particle.

3. The method for producing the metal nanowire of claim 1, wherein at least one of the first metal ion and the second metal ion is a silver ion.

4. The method for producing the metal nanowire of claim 1, further comprising a step of:
   (C) ripening the nucleus metal particle between step (A) and step (B).

5. The method for producing the metal nanowire of claim 1, wherein the metal salt solution (A) is added by a single-jet method (B) in step (A) and the metal salt solution (B) and the solution comprising the reducing agent (B) are added by a multi-jet method in step (B).

6. The method for producing the metal nanowire of claim 1, wherein a molar concentration of metal salt in the metal salt solution (A) is 0.001-1 mol/L and a molar concentration of metal salt in the metal salt solution (B) is 0.001-1 mol/L.

* * * * *